Oct. 10, 1961   A. R. RODRIGUEZ ET AL   3,004,197
CERAMIC CAPACITOR AND METHOD OF MAKING IT
Filed Dec. 13, 1956   2 Sheets-Sheet 1

INVENTORS
Antonio R. Rodriguez
Arthur B. Wallace
BY Dean Fairbank & Hirsch
ATTORNEYS ize Patent Office 3,004,197
Patented Oct. 10, 1961

3,004,197
CERAMIC CAPACITOR AND METHOD
OF MAKING IT
Antonio R. Rodriguez, Franklinville, and Arthur B. Wallace, Olean, N.Y., assignors to Aerovox Corporation, a corporation of Massachusetts
Filed Dec. 13, 1956, Ser. No. 628,023
10 Claims. (Cl. 317—258)

This invention relates to a capacitor of generally cylindrical shape, large electrode area and relatively small volume, having a continuous ceramic dielectric and to a method of preparing such a capacitor.

The use of ceramics as dielectrics for electrical capacitors is desirable because of their extremely high dielectric constants. Ceramics, such as barium titanate, titanium dioxide and allied materials have much higher dielectric constants than other commonly used dielectric materials, such as impregnated plastics, oil, and paper, so that units of high capacitance can be made which have an extremely small volume relative to other capacitors of the same electrical value. In addition, ceramic capacitors have improved ability to withstand extremes of temperature (especially high temperatures) and the corrosive effect of gases and of water vapor. Because the electrode may be applied as a metal dispersion and fired to the dielectric, it forms an integral part of the capacitor unlike the foil often used in paper capacitors, and so provides better contact to the dielectric.

High capacitance capacitors have commonly been prepared in the form of a plurality of separate flat plates of ceramic intervening between the electrodes thereof. These electrodes may be formed by painting a metal dispersion, such as silver, on the surface of the ceramic. Even though the very high dielectric constant of the ceramic of the type identified makes possible capacitors of reasonably small bulk and reasonably high capacitance, there is frequent need for capacitors of such high capacitance as to render necessary a larger size ceramic capactior than space limitations permit.

Where thin, flat, ceramic plates are resorted to for compactness, fracture is likely due to vibration or sudden acceleration of the equipment incorporating the same, with consequent capacitor failure, which seriously limits the scope of use of conventional ceramic capacitors.

It is among the objects of the present invention to provide a capacitor embodying a continuous ceramic dielectric of area many times greater than the outside dimensions of the structure, thus to afford a relatively tremendous contact area between the electrodes and the continuous dielectric material, thereby to attain small bulk for large capacitance, such as accomplished in rolled paper capacitors, and to a method which admits of fabricating capacitors of such tremendous capacitance of a size and shape convenient in the assembly of electrical and electronic apparatus and though a very thin sheet of ceramic serves as the dielectric, the likelihood of fracture thereof under vibration or during routine handling is small, without detracting from the desirable electrical and physical properties of conventional ceramic capacitors.

These objects, as well as others, which will be in part apparent from the ensuing description and in part specifically pointed out, are achieved by incorporating into finely divided ceramic dielectric material between about 10% and about 25% by weight of a film-forming, long-chain, high molecular weight plastic polymer. The film-forming material in liquid form, such as a solution or dispersion, is added to the ceramic to form a ceramic slip which is spread out upon a supporting surface or base in a thin layer and subsequently may be heated to drive off the excess liquid to form a self-sustaining film which includes the ceramic particles. In some cases, treatment to cure the plastic may be desirable. The resultant sheet is stripped from the base and cut to size.

The electrodes are then applied by metallizing the sheet with a dispersion, suitable for the purpose, that contains a metal highly resistant to oxidation at high temperatures. Desirably, one of the noble metals, for example, palladium or platinum, serves as the conducting electrode surface. The metallized sheets are then coiled or rolled about an arbor much in the same manner as a tubular metallized paper or paperfoil capacitor is produced.

The rolled ceramic unit is then fired to the maturing temperature of the ceramic, usually between about 2100° F. and 2600° F., which causes it to harden by crystal growth and, at the same time, drives off the organic material. The fired sections in which the electrode metal has become securely bonded to the fired ceramic dielectric are then coated with silver paste at their ends to provide for positive electrical connection to the electrodes, and are refired at a lower temperature in order to drive off the vehicle in which the silver has been dispersed and to obtain bonding of the silver to the ceramic and to the noble metal electrodes. The leads are then soldered to the silver terminals. The capacitor thus formed may be coated with an additional layer of ceramic or other protective material or sealed in a suitable protective envelope if desired.

A rolled, thin ceramic sheet is greatly strengthened to resist fracture by reason of the convolute conformation as contrasted with the brittleness of thin, flat sheets of ceramic used in conventional capacitors.

A clearer understanding of the present invention may be had by reference to the accompanying drawings in which.

Figure 1:
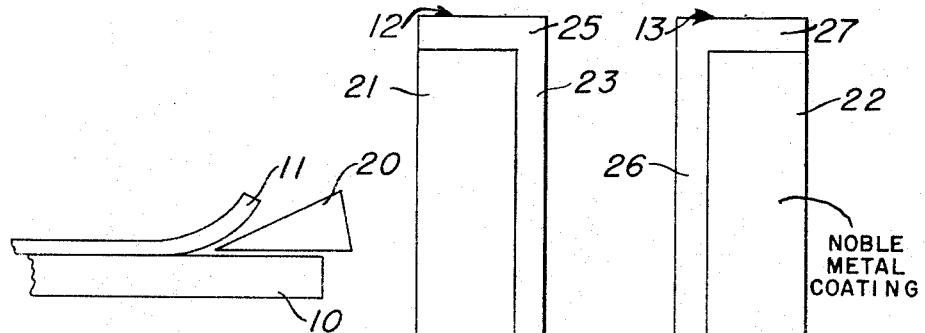
FIG. 1 is a view in vertical section showing a flexible sheet of ceramic material which has been formed on a flat base by slip casting, being stripped therefrom by a knife-edge.

The ceramic slip or slurry from which the flexible dielectric material is formed may be conveniently made from any one of a number of well-known ceramic compositions having a high dielectric constant, for example, mixtures of barium, calcium, lead and strontium titanates in finely divided form. For certain purposes, zirconates of the above-mentioned metals or titanium dioxide may also be included. Such compositions are to be distinguished from wholly vitreous materials which pass through a liquid phase when they are fired, such as glasses and enamels. The present invention, on the other hand, is concerned with the use of ceramics which undergo solid crystal growth during firing or maturing. The term ceramic as used herein means an inorganic substance in which the major phase is crystalline and is usually of an oxidic nature.

In preparing the ceramic slurry, the finely-divided powder is first mixed with water and a wetting agent, de-aired and passed through a 200 mesh screen. A slip is then prepared by the addition of a mixture of water, plastic material and a plasticizer for the plastic. The plastic materials suitable for the production of a flexible ceramic sheet capable of being rolled must be of the so-called "film-forming" type as opposed to the so-called "diluent" type. Film-forming plastics, which normally take the form of long-chain polymers, possess characteristics of internal flexibility in contrast to such plastics as polymers having substantial three-dimensional linkages which tend to be relatively rigid and will not form a composition capable of being flexed or coiled about itself, as, for example, phenolics, coumarone and indene.

Typical film-forming polymers useful in the present invention include, among others, polyvinyl alcohols, polyvinyl acetate, polyvinyl acetal, polyvinyl butyrate, vinylidene chloride, polyvinylidene chloride, polyvinyl chlorides, polyethylene, polytetrafluoroethylene, polyethylene esters, cellulose nitrates, esters and ethers, polystyrene and polyacrilate derivatives.

Suitable plasticizers for all of the film-forming polymers enumerated above, as well as others useful in the present invention, are well-known to the prior art. For example, if polyvinyl chloride be used as a film-forming polymer, suitable plasticizers would include such ketones as 2-butanone, cyclohexanone, isophorone and mesityl oxide. Other suitable plasticizers for this material include dioctyl phthalate and dibutyl phthalate. Plasticizers for polyvinyl alcohol include various glycols, such as triethylene glycol and other high molecular weight polyhydroxy alcohols.

If too much plastic be incorporated into the sheet, the subsequent firing of the rolled ceramic capacitor will burn out so large a volume of material as to substantially weaken the structure of the capacitor dielectric by leaving large voids between the ceramic particles. The ceramic is incapable of filling up such voids during firing. In addition, the burning out of a larger volume of organic material tends to cause excessive shrinkage which may crack the fired article.

It is believed that the polymer forms an adheisive film which binds the individual ceramic particles together, rather than forming a matrix in which the ceramic particles are embedded as separate entities. It has been found for purposes of the present invention, that not more than about 25% by weight of the dry ceramic composition should be burned out during firing of the ceramic. In order to obtain sufficient flexibility of the film, at least about 10% by weight of a plastic material (including both the film-forming material and the plasticizer) must be incorporated into the slip or slurry on a dry weight basis.

Turning now to the drawings, there is shown in FIG. 1 a flat base 10 which may be formed of glass or other suitable non-porous material upon which the ceramic slip, prepared by the addition of a water dispersion or solution of film-forming material to dry ceramic powder, has been cast into a thin layer 11. The film 11 may be formed in any conventional manner, as by spreading the slip over the base 10 and passing it under a fixed blade. The thickness of the film 11 may be adjusted by moving the blade vertically in relation to the base 10. Normally, extremely thin sheets, having a thickness of from about 0.001 to 0.012 inch, are required for effective coiling. After casting, the film 11 is air dried for approximately four to six hours. This drying period may be shortened by heating the surrounding atmosphere. Heating may also be desirable in some instances to effect curing of the film-forming plastic. Care must be taken not to heat too rapidly since uneven heating may cause cracks to develop in the film 11. After drying, the film 11 may be stripped from the base 10 by means of a thin knife or razor blade shown at 20.

During drying or curing, the film-forming material develops sufficient bonding power so that the ceramic particles in the film 11 are held together by a flexible adhesive. Although of extreme thinness, the film 11 is sufficiently tough to be capable of handling and is quite flexible.

Figures 2, 2A:
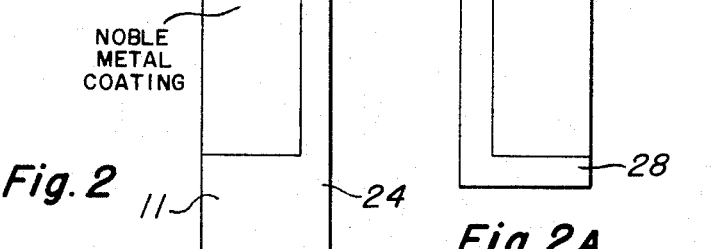
FIGS. 2 and 2a are views showing one side of two metallized sheets prior to their being aligned for rolling.

The film 11 is cut to predetermined sizes dictated by the capacitance desired and then metallized on both surfaces with a noble metal paint, such as palladium or platinum, in the form of a predetermined pattern. The paint may be applied by brushing, spraying, dipping, rolling or screening. A typical electrode pattern is illustrated in FIGS. 2, 2a, 3 and 3a. FIGS. 2 and 2a show two ceramic strips 12 and 13, each having a metallized rectangle 21 and 22 on their respective sunrfaces. Strip 12 is provided with an unmetallized margin 23 along its right edge and with unmetallized end margins 24 and 25. Strip 13 has an unmetallized margin 26 running along its left edge and unmetallized end margins 27 and 28. The edge margins prevent shortcircuiting between the electrodes on opposite sides of the dielectric strip. While end margins 25 and 27 and edge margins 23 and 26 may be of equal size, end margin 24 is somewhat wider than corresponding end margin 28. This is because strip 12 is the outside strip when the capacitor is wound and the extra width of the end margin 24 serves as a wrapping to cover the electrode surface that would otherwise be exposed if the strips 12 and 13 were of equal lengths.

Figures 3, 3A:
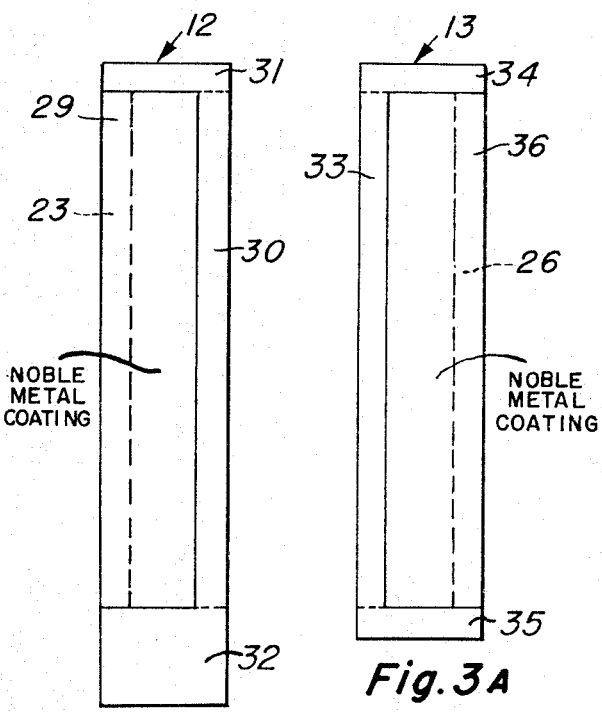
FIGS. 3 and 3a are views of the opposite sides of the metallized sheets shown in 2 and 2a respectively.

FIGS. 3 and 3a show the reverse sides of strips 12 and 13 which carry metallized rectangles 29 and 36 respectively. The dotted lines indicate the relative positions of end margins 23 and 26 on the opposite surfaces of the strips. Strip 12 is provided with an edge margin 30 at the opposite edge from margin 23 and with end margins 31 and 32 corresponding to end margins 25 and 24 respectively. Strip 13 has an edge margin 33 at the opposite edge from margin 26 and with end margins 34 and 35 corresponding to end margins 27 and 28 respectively.

Figure 4:
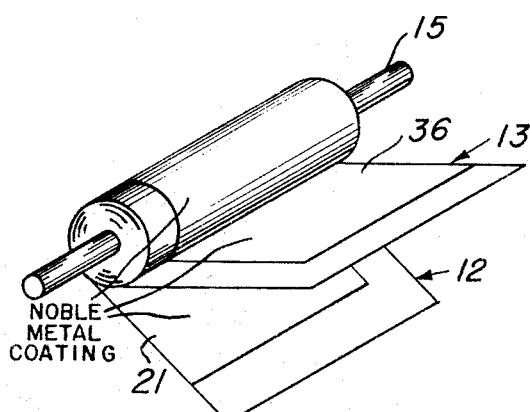
FIG. 4 is a perspective view of a partially rolled ceramic capacitor prepared in accordance with the present invention.

Strip 13 is placed on top of strip 12, as shown in FIG. 4, and the end margins 25 and 27 are secured to the thin, green ceramic rod 15 by means of a suitable adhesive and the strips are then rolled about the rod. Metallized rectangles 21 and 29 may be considered as the electrodes of one capacitor ($C_1$) with the ceramic strip 12 as the intervening dielectric while metallized rectangles 22 and 36 may be considered as the electrodes of another capacitor ($C_2$) with the strip 13 as the dielectric.

Figure 5:
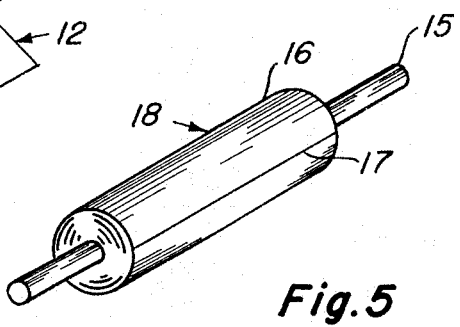
FIG. 5 is a perspective view of a rolled capacitor section prepared in accordance with the present invention.
Figure 6:
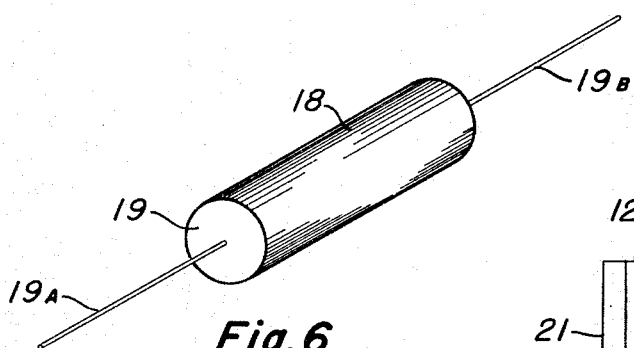
FIG. 6 is a perspective view of a completed capacitor having attached terminal leads.

FIG. 5 shows the strips 12 and 13 after they have been rolled about the rod 15. This rolling operation is carried out in a manner very similar to the preparation of conventional, paper-foil or metallized paper, tubular capacitors.

In order to provide additional protection and minimize chances of exposure of the palladium electrodes, an outer coating sheet 16 made of unmetallized ceramic film may be wrapped around the outside of the capacitor. This protective coating is preferably of the same composition as the ceramic sheets 12 and 13 which make up the dielectric and differs only in its lack of a conductive metal coating. The rod 15 may be rotated a few times after winding in order to tighten the capacitor roll. The seam 17 formed by the end of coating sheet 16 is then sealed as by moistening with a suitable solvent for the film-forming plastic.

The rolled, green capacitor sections, such as 18, are then placed in grooved plates and fired in a conventional ceramic firing furnace. An air draft through the furnace is maintained to provide sufficient oxygen for burning out the carbonacious material and to avoid chemical reduction of the ceramic. Firing is carried out according to conventional methods used in maturing ceramics and the temperature ordinarily is maintained in the range of from about 2100° F. to about 2600° F., depending on the particular ceramic composition being fired. Heating is normally carried on by keeping the ceramic pieces in the hot zone of the furnace for about two or three hours and then gradually cooling them.

Certain types of ceramic material, usually of much lower dielectric constant, may be fired at temperatures as low as about 1500° F. The advantage of using this type of dielectric in the present invention is that the lower firing temperature permits the use of silver as the electrodes rather than the more expensive palladium or platinum.

After firing and cooling, the capacitor section 18 is removed from the furnace and the central ceramic rod 15 is either pulled out or cut off flush with the ends of the capacitor. The section 18 is now hard and extremely rugged both because it has been fired and because of its convolutely wound configuration. The ends of the capacitor section 18 are then coated with a conductive silver paste consisting essentially of silver powder dispersed in an organic vehicle and the sections are fired about 1300–1500° F. to provide terminations 19 at either end of the section 18. In the case of ceramics having a high dielectric constant and requiring a high firing temperature, it is necessary to carry out the silvering step separately from the ceramic firing since the temperatures used in the latter process are so high as to cause melting of the silver which would make it difficult to maintain a uniform coating. When ceramics which may be fired below the melting point of silver are used, the silver may be applied before firing the dielectric. Conductive lead wires 19a and 19b are then soldered to the termination 19.

Figure 7:
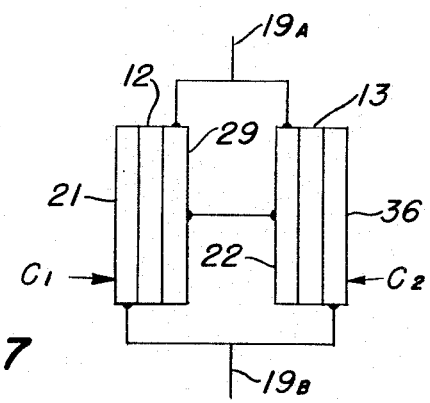
FIG. 7 is a schematic electrical diagram showing the connections formed between the electrodes of the completed capacitor.

FIG. 7 illustrates schematically the electrical connection between the capacitor $C_1$ and $C_2$ existing in the rolled assembly. The metallizing of the edges of the strips 12 and 13 makes electrical connection with the electrodes carried by them which extend to the metallized edge. Thus, as electrodes 21 and 36 both extend to the same aligned edges, they are electrically connected by the metallizing of these edges. Electrodes 21 and 36 also contact one another directly by virtue of the alignment of strips 12 and 13. A similar connection is made at the other edge between electrodes 22 and 29 which are also connected by direct contact when the strips 12 and 13 are rolled together as illustrated in FIG. 4. This arrangement connects capacitor elements $C_1$ and $C_2$ in parallel so that the capacitance of the rolled unit is the sum of the capacitances of elements $C_1$ and $C_2$.

In some instances, it may be desirable to impregnate the capacitor section 18 with silicone oil or other suitable impregnants in a manner analogous to the treatment of paper capacitor sections. Such impregnation is effective to correct for physical imperfections in the ceramic dielectric which might otherwise cause voltage breakdown.

The finished capacitor may be hermetically sealed by the application of an outer coating of ceramic or suitable plastic composition.

As a specific example of a ceramic casting slip useful in preparing rolled capacitors in accordance with the present invention, the composition set forth in Table I, below, may be regarded as illustrative:

*Table I*

| Ingredients | Composition |
| --- | --- |
| Powdered ceramic containing by weight 88 parts of barium titanate, 18 parts of clacium titanate and 0.2 part of clay. | 100 grams. |
| Triethylene glycol (plasticizer) | 8 grams. |
| 10% aqueous solution of polyvinyl alcohol | 65 grams (6.5 grams of polyvinyl alcohol). |
| Alkyl ether polyethylene glycol | 1 cc. |
| Water | 60 cc. |

In accordance with the present invention, it may also be desirable to incorporate small quantities of a deflocculating agent, such as an alginate or lignate, into the ceramic slip.

Although one particular form of the invention is a substantially tubular capacitor having axially extending leads from either end thereof, it may be convenient for certain applications to flatten out the cylindrical section and attach parallel leads at either end thereof at right angles to the axis of the section. Such a flattening operation may be carried out after the section has been rolled and is still in a plastic condition prior to its being fired. Alternatively, the capacitor may be rolled or folded initially to the shape desired.

The size advantage to be gained by using the present invention may be seen by comparing a conventional paper capacitor with a ceramic capacitor of the same size. For example, a typical impregnated kraft paper capacitor having a dielectric constant of 5 and a thickness of 0.00025 and utilizing aluminum foil electrodes could be rolled to form a capacitor of given size having a capacitance of 0.1 microfarad. Using the present invention, a ceramic capacitor having palladium electrodes and of the same size and shape could be made utilizing a ceramic having a dielectric constant of 6,000 and a thickness of 0.003 inch. Such a capacitor would have a capacitance of 10 microfarads. In other words, for a given volume, 100 times as much capacitance can be obtained by using the present invention. Concomitantly, in many instances, a volume reduction of approximately 100 times can be obtained to produce a given capacitance by using the present invention as compared with conventional paper-foil capacitors.

The present invention permits construction of capacitors of reasonable size and capacitance from ceramic materials having a relatively low dielectric constant but possessing other desirable properties, such as substantial invariance of electrical properties over a wide temperature range. Stacked ceramic capacitors employing this type of ceramic dielectric are of unwieldy size but rolled capacitors made in accordance with the present invention combine substantial capacitance with practical bulk. Aluminum oxide and magnesium orthosilicate are typical ceramic materials of relatively low dielectric constant to which the present invention may be applied.

The present invention has been described with respect to the preparation of a capacitor having two metallized sheets of ceramic wound together. The invention is equally applicable to the preparation of a capacitor using only one metallized ceramic sheet where the electrodes are formed in such a pattern as to obviate shorting upon rolling. Such patterns are commonly used in making metallized paper capacitors as exemplified by U.S. Patent 2,736,766.

While the present invention has been described with respect to and illustrated by particular embodiments thereof, such as the particular plastic compositions employed to produce the flexible sheet material suitable for winding, it will be understood, of course, that other equivalent materials besides those enumerated may also be employed. For example, those plastic materials are equivalents of the ones specifically mentioned if they are capable of forming film-forming plastic in accordance with the general principles set forth above. Therefore, the present invention includes those equivalents which will occur to those skilled in the art and is not limited to the specific examples enumerated.

Having thus described our invention, what we claim is new and desire to secure by Letters Patent of the United States is:

1. The process of making a ceramic capacitor comprising the steps of mixing a finely divided ceramic material having high dielectric constant with from about 10% to about 25% by weight of an organic material capable of conversion to a film-forming, long-chain, high molecular weight polymer, forming a self-sustaining sheet of said ceramic material and said polymer, causing a layer of conductive metal of melting point to withstand the firing temperature of the ceramic, and to adhere to at least a portion of one surface of said sheet, winding the metallized sheet into a coil and subsequently firing the coiled structure to mature the ceramic component thereof and to burn said polymer out of said coiled sheet, thereby to produce a capacitor the coiled dielectric of which is substantially solely of dielectric ceramic sheet material, the thickness of which may be as little as 0.003 inch or less.

2. The process according to claim 1 wherein the coiled sheet is impregnated with a liquid impregnant subsequent to maturing.

3. A substantially cylindrical convolutely wound capacitor which is the product of the process recited in claim 1 having a dielectric consisting substantially solely of matured ceramic intervening between layers of said conductive metal.

4. The capacitor according to claim 3 wherein said dielectric comprises barium titanate.

5. The capacitor according to claim 3 wherein said dielectric comprises titanium dioxide.

6. The capacitor according to claim 3 wherein said dielectric comprises lead titanate.

7. The capacitor according to claim 3 wherein said dielectric comprises aluminum oxide.

8. A ceramic capacitor comprising two matured ceramic strips metallized in a predetermined pattern on each surface thereof and convolutely wound together to form a cylinder the dielectric of which is substantially solely of ceramic, metal terminations plated upon each end of said cylinder and lead wires attached to each of said terminations.

9. The capacitor according to claim 8 wherein said strips are metallized with platinum.

10. The capacitor according to claim 8 wherein said strips are metallized with palladium.

References Cited in the file of this patent

UNITED STATES PATENTS

| | | |
|---|---|---|
| 2,184,316 | Plummer | Dec. 26, 1939 |
| 2,300,072 | Smyers | Oct. 27, 1942 |
| 2,360,479 | Detrick et al. | Oct. 17, 1944 |
| 2,506,244 | Stopka | May 2, 1950 |
| 2,539,446 | Lies | Jan. 30, 1951 |
| 2,556,257 | Denes | June 12, 1951 |
| 2,582,993 | Howatt | Jan. 22, 1952 |
| 2,593,922 | Robinson | Aug. 22, 1952 |
| 2,619,443 | Robinson | Nov. 25, 1952 |
| 2,711,498 | Robinson | June 21, 1955 |
| 2,778,762 | Eisler | Jan. 22, 1957 |